US009360352B2

(12) United States Patent
Chen et al.

(10) Patent No.: US 9,360,352 B2
(45) Date of Patent: Jun. 7, 2016

(54) METHOD FOR DETERMINING LIGHTNING HAZARD DISTRIBUTION OF POWER NETWORK (75) Inventors: Jiahong Chen, Wuhan (CN); Jian Wang, Beijing (CN); Xuefang Tong, Wuhan (CN); Yaxin Liu, Beijing (CN); Qin Zhang, Wuhan (CN); Yi Luo, Beijing (CN); Haitao Wang, Wuhan (CN); Wanxing Feng, Wuhan (CN); Shanqiang Gu, Wuhan (CN); Xiaolan Li, Wuhan (CN)

(73) Assignees: Wuhan NARI Limited Company of State Grid Electric Power Research Institute, Wuhan (CN); State Grid Electric Power Research Institute, Nanjing (CN); North China Electric Power Research Institute Co., Ltd., Beijing (CN)

( * ) Notice: Subject to any disclaimer, the term of this patent is extended or adjusted under 35 U.S.C. 154(b) by 463 days.

(21) Appl. No.: 12/811,594

(22) PCT Filed: Apr. 7, 2009

(86) PCT No.: PCT/CN2009/071172
§ 371 (c)(1),
(2), (4) Date: Jul. 2, 2010

(87) PCT Pub. No.: WO2009/129717
PCT Pub. Date: Oct. 29, 2009

(65) Prior Publication Data
US 2010/0286954 A1 Nov. 11, 2010

(30) Foreign Application Priority Data
Apr. 21, 2008 (CN) .......................... 2008 1 0047398

(51) Int. Cl.
G01D 21/00 (2006.01)
G06Q 50/06 (2012.01)

(52) U.S. Cl.
CPC ................ *G01D 21/00* (2013.01); *G06Q 50/06* (2013.01)

(58) Field of Classification Search
CPC ............................. G06R 31/085; Y04S 20/36
USPC ............................ 702/3, 4, 60, 179, 1, 2, 181
See application file for complete search history.

(56) References Cited

U.S. PATENT DOCUMENTS

| 5,528,494 A * | 6/1996 | Moses ............................... 702/4 |
| 6,047,119 A * | 4/2000 | Kappenman et al. ........... 703/17 |
| 2010/0094687 A1* | 4/2010 | Waggaman, III ............... 705/11 |

FOREIGN PATENT DOCUMENTS

| CN | 2228661 Y | 6/1996 |
| CN | 1936880 A | 3/2007 |
| CN | 101261616 A | 9/2008 |
| JP | 2008022606 A | 1/2008 |

OTHER PUBLICATIONS

Overvoltage protection and insulation coordination for AC electrical installations. DL/T 620-1997. Oct. 1, 1997. Partial translation provided by Unitalen Attorneys At Law.

(Continued)

*Primary Examiner* — Alexander Satanovsky
*Assistant Examiner* — Ivan Rabovianski
(74) *Attorney, Agent, or Firm* — Harness, Dickey & Pierce, P.L.C.

(57) ABSTRACT

A method for determining a lightning hazard distribution of a power network, includes: deriving a shielding failure lightning hazard distribution of the power network and a back flashover lightning hazard distribution of the power network from the number of ground lightning in each grid and ranges of hazardous currents, and deriving a historical lightning hazard distribution of the power network from a lightning faults database of the power network and the grids; and determining the lightning hazard distribution of the power network by integrating the shielding failure lightning hazard distribution of the power network, the back flashover lightning hazard distribution of the power network and the historical lightning hazard distribution of the power network.

4 Claims, 4 Drawing Sheets

(56) References Cited

OTHER PUBLICATIONS

Jia-Hong Chen et al. Statistical Method of Lightning Parameters. Wuhan High Voltage Research Institute of SGCC, Wuhan 430074, China. High Voltage Engineering, vol. 33, No. 10, Oct. 2007.

Jia-Hong Chen et al. Analysis of lightning distribution characteristics for 1000 kV UHV AC transmission line corridor. Wuhan High Voltage Research Institute of SGCC, Wuhan 430074, China. Electric Power, vol. 40, No. 12, Dec. 2007.

\* cited by examiner

METHOD FOR DETERMINING LIGHTNING HAZARD DISTRIBUTION OF POWER NETWORK

This application claims priority to Chinese Patent Application no. 200810047398.9, filed with the Chinese Patent Office on Apr. 21, 2008 and entitled "METHOD FOR DETERMINING LIGHTNING HAZARD DISTRIBUTION OF POWER NETWORK", which is hereby incorporated by reference in its entirety.

FIELD OF THE INVENTION

The present invention relates to the technical field of lightning protection engineering, and in particular to a method for determining lightning hazard distribution of a power network.

BACKGROUND OF THE INVENTION

The lightning hazard distribution of a power network is a statistical technology representing the lightning flashover risk probability of high voltage transmission lines, and is the basis of lightning protection design and protective measures decision for transmission lines. It has been long that lightning activity regions are classified in the power engineering only according to long-recorded thunderstorm days data which are only descriptive of regularity of lightning activities. For example, a region with the average thunderstorm days no more than 15 days is classified as the infrequent lightning region, a region with the average thunderstorm days more than 40 days is classified as the frequent lightning region, and a region with the average thunderstorm days more than 90 days is classified as the strong lightning region.

As known by the applicants, a main deficiency of such a simple method for classifying lightning regions lies in that the "thunderstorm days" itself can not completely represent the characteristics of the lightning activities, i.e., a thunderstorm day can not represent the specific lightning frequency. Consequently, such a simple method for classifying lightning regions provides a limited guide for the lightning protection engineering design.

At present, worldwide application of modern lightning monitoring devices, a representative of which is the lightning location system, makes it possible to obtain and apply regional ground lightning characters of great concern to people, e.g., parameters such as the position, the amplitude and polarity of lightning current, the occurrence time, etc. In recent years, the use of the ground lightning density (fl/km$^2$/a) characterizing the lightning distribution in place of the thunderstorm days has become a trend. A good example is a method for taking statistics of lightning parameters including ground lightning density using a grid method as disclosed in the Chinese patent document (Patent Application No. 200610124786.3) entitled "METHOD FOR TAKING STATISTICS OF LIGHTNING PARAMETERS USING GRID".

The applicants have recognized during research that the ground lightning density distribution is basic information characterizing the frequency and distribution of ground lightning activities and basis in lightning protection design for ground objects. However, specifically for the lightning protection design of the power network, not all lightning activities can cause insulation flashover of a high voltage overhead transmission line and a substation due to their structural features and insulation features, but a part of lightning activities called hazardous lightning can cause a flashover of power network. The distribution of this part of lightning hazardous to the power network is different from the ground lightning density distribution. Therefore, for the power network in question, the existing ground lightning density distribution can not reflect intuitively any lightning hazard distribution of the power network and consequently can not be a straightforward criterion for lightning protection design of the power network.

At present, a half number of statistical trip-out events of extra high voltage transmission lines in China arise due to lightning flashover. Although some lightning protection devices perform well, they are difficult to be installed along the whole high voltage transmission line due to their limited protection ranges and costs, so it is highly desired in engineering for a technology to represent the lightning hazard distribution of the power network and guide targeted lightning protection for the high voltage transmission line.

The power network is distributed widely, and has various insulation levels of transmission lines and complex causes of forming lightning hazard, at the same time, a large amount of data detected by the lightning location system and various complex spatial thematic attribute data for geographical processing are related to the lightning hazard distribution of the power network, and therefore, the technology of automatic statistics of the lightning hazard distribution of the power network can be realized only if the data is processed using a computer and an information system platform. There has been so far no effective and automatic statistics technology to take statistics of the lightning hazard distribution of the power network across a large region and with a large sample and various insulation levels, which shall be addressed soon.

SUMMARY OF THE INVENTION

An object of the invention is to overcome the deficiency in the prior art by proposing a method for determining a lightning hazard distribution of a power network. The invention relates to a computer automated statistics technology suitable for taking statistics of the lightning hazard distribution of a power network across a large region and with a large sample and various insulation levels.

A method for determining a lightning hazard distribution of a power network includes:
  deriving a shielding failure lightning hazard distribution of the power network and a back flashover lightning hazard distribution of the power network from the number of ground lightning in each grid and ranges of hazardous currents, and deriving a historical lightning hazard distribution of the power network from a lightning faults database of the power network and the grids; and
  determining the lightning hazard distribution of the power network by integrating the shielding failure lightning hazard distribution of the power network, the back flashover lightning hazard distribution of the power network and the historical lightning hazard distribution of the power network.

The deriving a shielding failure lightning hazard distribution of the power network and a back flashover lightning hazard distribution of the power network from the number of ground lightning of grids and ranges of hazardous currents includes:
  setting values of a shielding failure hazardous current range and values of a back flashover hazardous current range according to an insulation margin of the power network;
  performing amplitude comparison on the values of the shielding failure hazardous current range and the values of the back flashover hazardous current range, and removing data of grids with amplitudes of lightning current beyond the shielding failure hazardous current range and the back flashover hazardous current range; and dividing the number of remaining ground lightning by corresponding grid areas to get the shielding failure lightning hazard distribution of the power network and the back flashover lightning hazard distribution of the power network respectively.

The deriving a historical lightning hazard distribution of the power network from a lightning faults database of the power network and the grids includes:

creating a lightning failure database of the power network;

comparing in position the data from the lightning failure database of the power network and the grids, and invoking shielding failure points and back flashover failure points into corresponding grids by longitudinal and latitudinal coordinates of geographical information; and marking the grids in connection with the grids which serve as a center to get the historical lightning hazard distribution of the power network.

The determining the lightning hazard distribution of the power network by integrating the shielding failure lightning hazard distribution of the power network, the back flashover lightning hazard distribution of the power network and the historical lightning hazard distribution of the power network includes:

dividing the historical lightning hazard distribution of the power network into a region of back flashover failure points and a region of shielding failure points by terms of the nature of failure points;

superposing the region of back flashover failure points and the region of shielding failure points respectively on the back flashover lightning hazard distribution of the power network and the shielding failure lightning hazard distribution of the power network; and rendering the historical failure region resulting from the superposing with an attribute upward adjacent to the region respectively, wherein the respective grids are rendered with a rendering attribute which has a higher attribute level of a density value in corresponding locations of the two distributions when integrating the shielding failure lightning hazard distribution of the power network and the back flashover lightning hazard distribution of the power network, to form the lightning hazard distribution of the power network.

At least one computer performs operations.

An advantage of the invention lies in that the invention implements a method for taking statistics of a lightning hazard distribution from automatically monitored lightning data across a large region and with a large sample effectively and automatically using a computer in combination of various insulation structure features of a power network to thereby address the problem in the prior art that the lightning hazard distribution of the power network can not be determined definitely by the thunderstorm days division regions and ground lightning density distribution. The method according to the invention is straightforward, well operational and practicable.

DETAILED DESCRIPTION OF THE INVENTION

The invention will be further detailed below with reference to the drawings.

As illustrated in FIG. 1, FIG. 2, FIG. 3 and FIG. 4, the invention uses data detected automatically by a lightning location system as statistic samples such that the automatically monitored data is input to a Geographical Information System (abbreviated as GIS) enabled computer by using a processing program of the computer to create a database, uses the GIS and the database as an analysis platform and takes statistics of lightning parameters using a grid method. A typical lightning hazard criterion of ground objects is set in light of the anti-lightning capability and features of the objects, and then a hazardous current data analysis system is created based on the typical criterion and the lightning data subject to the statistics process using the computer in combination of shielding failure characteristic current and back flashover characteristic current in various voltage levels of power network, required data and analysis results are determined using the grid method, and the analysis results are compared, verified and modified in a lightning trip-out record to obtain the lightning hazard distribution of the corresponding objects.

Figure 1:
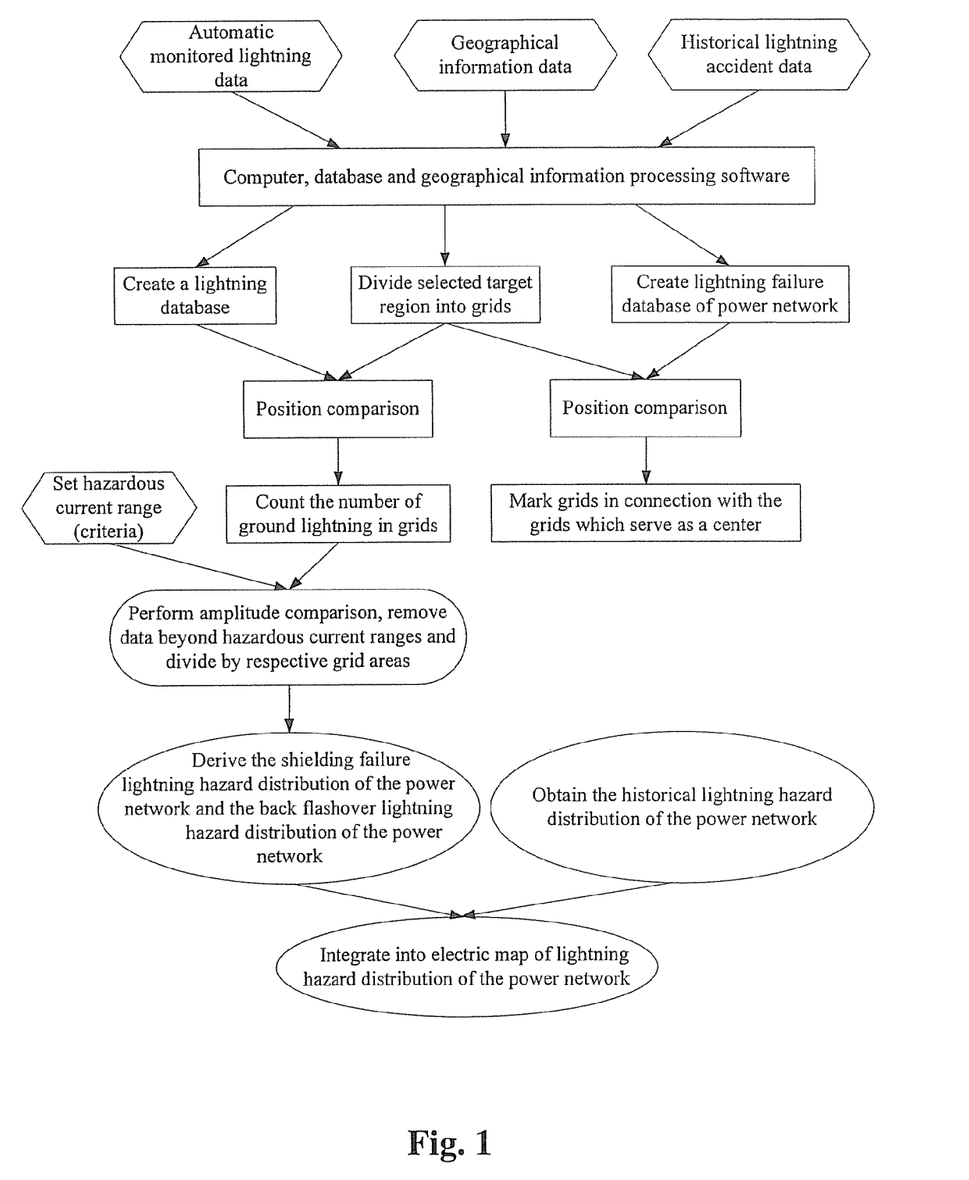
FIG. 1 is a block diagram illustrating a principal of the invention.

The following steps are adopted:

(1) The automatically monitored lightning data is stored in the database through the computer as thematic attribute data by time and position as well as the amplitude and polarity of lightning current. The GIS enabled computer is adopted to set a program to divide a target object, i.e., a selected region on a digital map, into grids with equal areas, and each of the grids is set as a lightning statistic unit. Data from the lightning database and the geographical corresponding grids are compared in position, and the thematic data in the lightning database is invoked into the corresponding grids according to their geographical attribute as a statistic sample to take statistics of the number of lightning in each grid.

(2) A shielding failure hazardous current range and a back flashover hazardous current range (criteria) are set according to the insulation margin of the power network. Amplitude comparison is performed according to the criteria to remove data with amplitudes of lightning current being beyond the shielding failure hazardous current range and the back flashover hazardous current range in each grid, and to divide the number of remaining ground lightning by corresponding grid areas to get the shielding failure lightning hazard distribution of the power network and the back flashover lightning hazard distribution of the power network respectively.

(3) Also the historical lightning flashover accident records of the power network are stored in the computer as thematic attribute data by occurrence time, longitudinal and latitudinal coordinates of lightning points, the type of the flashover and the level of voltage to create a lightning failure database of the power network. The data from the lightning failure database and the geographical corresponding grids are compared in position, the shielding failure points and the back flashover failure points are respectively invoked into the corresponding geographical grids by the longitudinal and latitudinal coordinates of geographical information, and the grids in connection with the grids which serve as a center are marked to get historical lightning hazard regions of the power network.

(4) The shielding failure lightning hazard distribution of the power network, the back flashover lightning hazard distribution of the power network and the historical lightning hazard regions of the power network are integrated to form the lightning hazard distribution of the power network.

The foregoing data processing can be performed on a single computer or several computers connected over a network to exchange the data for processing to thereby obtain effectively statistical data resources for the invention and realized statistical data resources sharing.

Figure 2:
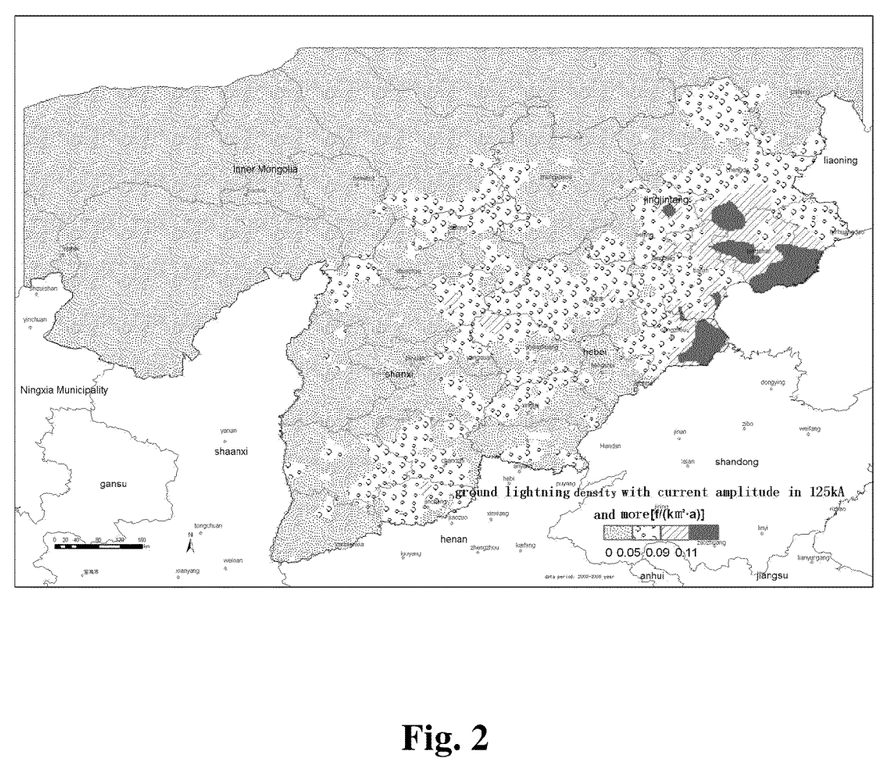
FIG. 2 is a diagram illustrating the back flashover lightning hazard distribution of the 500 kV power network of Northern China in 2003 to 2006.
Figure 3:
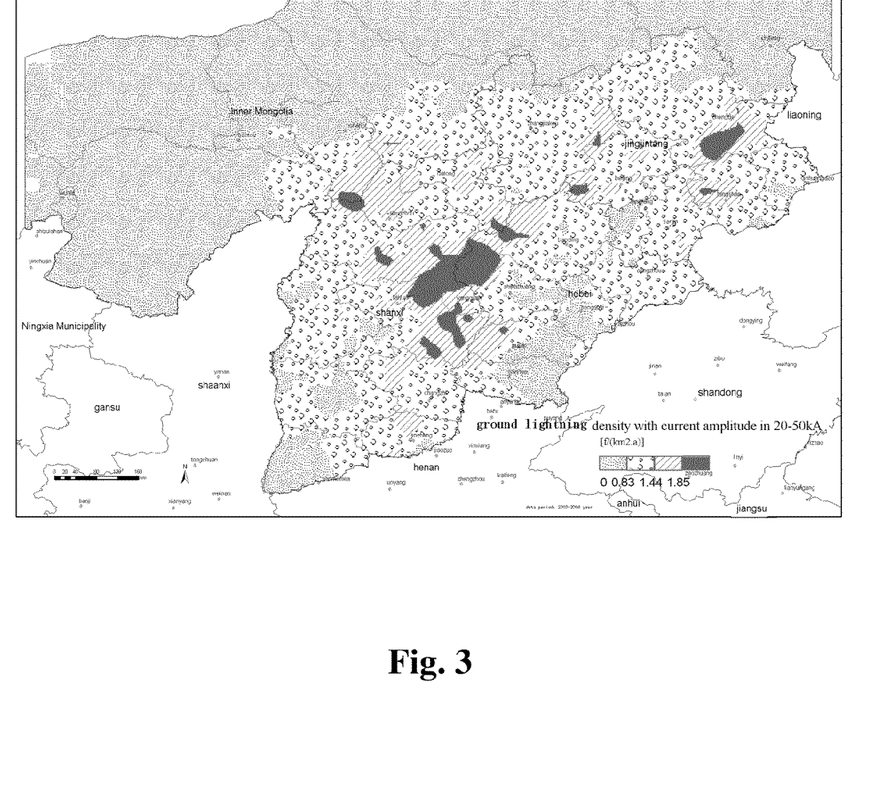
FIG. 3 is a diagram illustrating the shielding failure lightning hazard distribution of the 500 kV power network of Northern China in 2003 to 2006.
Figure 4:
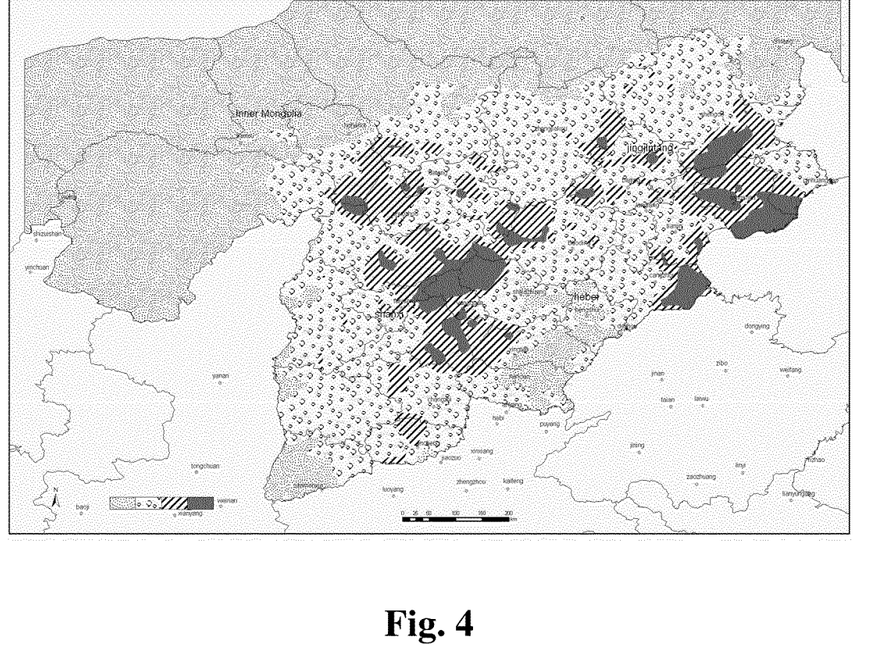
FIG. 4 is a diagram illustrating the lightning hazard distribution of the 500 kV power network of Northern China in 2003 to 2006.

FIG. 2 to FIG. 4 illustrate specific applications of the invention on a digital map of Northern China.

Collected data including automatically monitored data from the lightning location system in Northern China with geographical attributes and lightning trip-out records with geographical attributes of the power network is entered through a computer and subject to data processing using a computer program, and the region of Northern China is divided into a series of grids of 0.2° x0.2°. Particularly:

1. Selection of the Hazardous Current Range (i.e., Selection of the Criterion)

Occurrence of lightning hazard of the power network has its specific feature of being subject to the insulation level of the power network, so that a lightning accident may arise only due to a ground lightning with a current amplitude in some current amplitude ranges, and the hazardous extent to the lightning current will vary with the amplitude thereof.

Determination of the hazardous current range is a precondition to determine the lightning hazard distribution of the power network. The hazardous current is selected by the lightning performance of the majority of transmission lines in the power network with the existing calculation method. The insulation level of the power network varies significantly with a varying voltage level, the lightning shielding performance and lightning back flashover performance of the same voltage grade power network differ significantly, and there are different protection measures against lightning for shielding failure and back flashover from the perspective of application, and therefore, different shielding failure hazardous current ranges and back flashover hazardous current ranges are proposed for different voltage levels. Also, for the same voltage level, the hazardous current range varies with a varying type of tower, a varying grounding resistance or a varying shielding angle. The selection of the hazardous current range shall ensure that the hazardous currents of the majority of transmission lines fall within the selected hazardous current range. The back flashover hazardous current range (start value and end value) is solved as in the specification existing in the electric industry "Overvoltage protection and insulation coordination for alternating current electrical installations" (DL/T620-1997), the shielding failure lightning withstand level still complies with this specification, while the maximum critical shielding failure current is determined according to the electrical geometrical model.

(1) Determination of Back Flashover Hazardous Current (i.e., Determination of a Criterion Value)

The back flashover hazardous current range is determined using a method recommended in the specification existing in the electric industry "Overvoltage protection and insulation coordination of alternating current electrical installations" (DL/T620-1997) to be calculated by Equation (1), where every parameter is defined as follows: $u_{50\%}$ is the critical impulse flashover voltage of insulators, k is the coupling coefficient between the ground wire and the conductor, $k_0$ is the geometrical coupling coefficient between the ground wire and the conductor, $\beta$ is the shunt coefficient of the tower, $R_i$ is the impulse grounding resistance of the tower, $h_a$ is the crosspiece height, $h_t$ is the tower height, $L_t$ is the tower inductance, $h_g$ is the average height of the ground wire, and $h_c$ is the average height of the conductor.

$$I_1 = \frac{u_{50\%}}{(1-k)\beta R_i + \left(\frac{h_a}{h_t} - k\right)\beta \frac{L_t}{2.6} + \left(1 - \frac{h_g}{h_c}k_0\right)\frac{h_c}{2.6}} \quad (1)$$

The back flashover lightning withstand level of the transmission line varies with a varying type of tower or a varying grounding resistance, and at the same voltage level, a calculation result of a transmission line with a lower lightning withstand level is the lower limit of the back flashover hazardous current range, so that the back flashover hazardous currents of the majority of transmission lines fall within the selected back flashover hazardous current range.

For the 500 kV power network, the number of insulators in use is 28 pieces, U50% is 2420 kV, the span between poles is 450 m, the grounding resistance proximate to the tower is 15Ω, and the calculation result is as illustrated in Table 1. As can be apparent from the calculation result, the power frequency voltage strongly influences the lightning withstand level, and lightning withstand level with power frequency voltage (this is the case in practice) reduces by 18% in average relative to that without power frequency voltage.

Therefore, a lower limit 134 kA (15Ω is required for a standardized line), generally 125 kA, of the back flashover hazardous current range can be taken for a 500 kV transmission line.

Similarly, a lower limit 75 kA of the back flashover hazardous current can be taken for a 220 kV transmission line.

TABLE 1

| Calculation results of back flashover lightning withstand level of the 500 kV line | | | | | | | |
|---|---|---|---|---|---|---|---|
| without power frequency voltage | Grounding resistance, Ω | 7 | 10 | 15 | 20 | 30 | 40 |
| | Withstand level, kA | 244 | 204 | 164 | 137 | 106 | 88 |
| with power frequency voltage | Grounding resistance, Ω | 7 | 10 | 15 | 20 | 30 | 40 |
| | Withstand level, kA | 200 | 168 | 134 | 112 | 87 | 72 |
| Reduction (%) | | | 18.0% | 17.6% | 18.3% | 18.2% | 17.9% | 18.2% |

(2) Determination of shielding failure hazardous current (i.e., selection of the criterion)

According to the invention, a method for determining the shielding failure hazardous current range integrates both the regulation method and the electrical geometrical model method in combination with operation experiences, so that a lower limit of shielding failure hazardous current is determined from the lightning withstand level using the method recommended in the specification existing in the electric industry "Overvoltage protection and insulation coordination of alternating current electrical installations" (DL/T620-1997) to be calculated by Equation (2). An upper limit of the shielding failure hazardous current is calculated using the electrical geometrical model method, a critical striking distance is determined from parameters of the transmission line, and the maximum shielding failure hazardous current is determined from the critical striking distance.

$$I_2 = \frac{u_{50\%}}{100} \quad (2)$$

The shielding failure withstand level of a transmission line and the maximum shielding failure hazardous current vary with a varying type of tower and a varying shielding angle. The start and end values of shielding failure hazardous current of the transmission line for various towers (e.g., single-circuit, double-circuit, cup-tower, cat-like tower, etc.) are calculated using the foregoing method and integrated and then amplified appropriately, so that the hazardous shielding failure currents of the majority of transmission lines fall within the selected range. The range shall not be too large; otherwise the feature of the shielding failure hazardous current at this voltage level can not be represented. The range shall not be too small, in which case many hazardous events may be missed.

According to the regulation method, the shielding failure withstand level at 220 kV is generally 14.0 kA (corresponding U50% of 1400 kV).

The critical shielding failure currents are calculated for two typical transmission lines in Table 2, and results thereof are depicted in Table 3. Seven lightning trip-out accidents of the 220 kV power network in the region of Cheng De in June, 2006 are analyzed, which include four shielding failure events, and calculation results of shielding failure current are depicted in Table 4.

As can be apparent from both Table 3 and Table 4, the shielding failure current range of the 220 kV transmission lines calculated with the striking distance method is generally around 15-40 kA. The lightning shielding failures in the power networks of Shanxi Province and Hebei Province are further investigated and statistics thereof are performed, and also the magnitude of shielding failure current samples generally falls within the shielding failure hazardous current range under study.

The shielding failure hazardous current range of 220 kV transmission line may be determined as [10 kA, 40 kA] in view of the foregoing.

Similarly, the shielding failure hazardous current range of the 500 kV power network may be determined as [20 kA, 50 kA].

TABLE 2

Table of parameters for two typical 220 kV transmission lines

| Tower type | Span (m) | Conductor height (m) | Ground wire height (m) | Horizontal distance of hanging point of conductor from center of tower (m) | Horizontal distance of hanging point of ground wire from center of tower (m) | Length of insulator string (m) |
|---|---|---|---|---|---|---|
| $SZ_2$ | 358 | 30 | 40 | 13 | 8.5 | 2.34 |
| $SJ_2$ | 306 | 30.5 | 41.5 | 7.2 | 3.8 | 2.34 |

TABLE 3

Calculation result of maximum critical current

| Tower type | Hill Angle | Striking distance expression | Striking distance Coefficient | Maximum striking distance | Maximum current |
|---|---|---|---|---|---|
| $SZ_2$ | 0° | $r = 8.0I^{0.65}$ | 1 | 59.23 | 21.75 |
| | | $r = 10.0I^{0.65}$ | 1 | 59.23 | 15.434 |
| | 20° | $r = 8.0I^{0.65}$ | 1 | 108.54 | 55.234 |
| | | $r = 10.0I^{0.65}$ | 1 | 108.54 | 39.194 |
| $SJ_2$ | 0° | $r = 8.0I^{0.65}$ | 1 | 50.975 | 17.270 |
| | | $r = 10.0I^{0.65}$ | 1 | 50.975 | 12.253 |
| | 20° | $r = 8.0I^{0.65}$ | 1 | 85.530 | 38.287 |
| | | $r = 10.0I^{0.65}$ | 1 | 85.530 | 27.166 |

TABLE 4

Calculation for maximum critical current of 220 kV line (instances)

| Line failure condition | Shielding angle (deg) | Hill Angle (deg) | Maximum striking distance, rm (m) | Maximum current, Im (kA) | Determination |
|---|---|---|---|---|---|
| Xing He 134# C Phase, 20.3 kA, shielding failure | 17.58 | 30 | 135.42 | 40.073 | Shielding failure |
| Xing He 132# C Phase, 20.2 kA, shielding failure | 13.24 | 30 | 90.172 | 25.682 | Shielding failure |

TABLE 4-continued

Calculation for maximum critical current of 220 kV line (instances)

| Line failure condition | Shielding angle (deg) | Hill Angle (deg) | Maximum striking distance, rm (m) | Maximum current, Im (kA) | Determination |
|---|---|---|---|---|---|
| Yuan Zun 141# A, B Phase, 57.1 kA, back flashover | 9.7 | 30 | 61.2 | 15.81 | Back flashover |
| Cheng Long Yi Hui 89# A Phase, 24 kA, shielding failure | 16.5 | 30 | 98.512 | 28.69 | Shielding failure |
| Ying Zhou Yi Hui 29# C Phase, 43.4 kA, back flashover | 13.2 | 15 | 126.36 | 39.155 | Back flashover |
| Ying Zun 112# C Phase, 199.5 kA, back flashover | 15.469 | 15 | 77.21 | 21.153 | Back flashover |
| Zhou Long Yi Hui 51# C Phase, 26.6 kA, shielding failure | 13.24 | 30 | 92.861 | 26.64 | Shielding failure |

2. Determination of Lightning Hazard Distribution Map of Power Network

Firstly, a back flashover lightning hazard distribution map of the power network and a shielding failure lightning hazard distribution map of the power network are determined. Taking determination of the lightning hazard distribution map of the 500 kV power network in Northern China as an example, the foregoing start and end values of hazardous current are taken as the criterion, and statistics are taken of values of hazardous lightning density in each grid of 0.2° x0.2°. Statistics are taken of the ground lightning densities with the amplitude of 125 kA and more in each grid to get the back flashover lightning hazard distribution map of the 500 kV power network in Northern China as illustrated in FIG. 2. The map is displayed in four rendered zones, where the area filled with small thin dots represents that the value of ground lightning density here with the amplitude of 125 kA and more is in the range [0, 0.05) f/(km²·a), the area filled with small circles represents that the value of ground lightning density here with the amplitude of 125 kA and more is in the range [0.05, 0.09) f/(km²·a), the area filled with oblique lines represents that the value of ground lightning density here with the amplitude of 125 kA and more is in the range [0.09, 0.11) f/(km²·a), and the area filled with facets represents that the value of ground lightning density here with the amplitude of 125 kA and more is equal to or larger than 0.11 f/(km²·a).

Statistics are taken of the ground lightning density with the amplitude falling within the range [20 kA, 50 kA] in each grid to get the shielding failure lightning hazard distribution map of the 500 kV power network in Northern China as illustrated in FIG. 3. The area filled with small thin dots represents that the value of ground lightning density here with the amplitude of [20, 50] kA is in the range [0, 0.83) f/(km²·a), the area filled with small circles represents that the value of ground lightning density here with the amplitude of [20, 50] kA is in the range [0.83, 1.44) f/(km²·a), the area filled with oblique lines represents that the value of ground lightning density here with the amplitude of [20, 50] kA is in the range [1.44, 1.85) f/(km²·a), and the area filled with facets represents that the value of ground lightning density here with the amplitude of [20, 50] kA is equal to or larger than 1.85 f/(km²·a).

Secondly, historical lightning hazard distribution regions of the power network are determined. The operation experience is verification and summarization of all measures and basic theories and an embodiment of the integration of the power network and the nature. Firstly, the operation experience will be supplementary to the lightning hazard distribution based upon the hazardous current distribution. A lightning failure database including geographical attributes is created based upon lightning failure records in Northern China in 2000 to 2007. 43 lightning failures in total occurred with 500 kV transmission lines in Northern China, which include 4 back flashover failures and 39 shielding failures. Failure points are marked in the electronic map of Northern China, grids meeting the failure points are located, where adjacent grids are picked out to form the historical lightning hazard distribution regions of the power network.

Finally, the back flashover lightning hazard distribution map of the power network, the shielding failure lightning hazard distribution map of the power network and the historical lightning hazard distribution of the power network are integrated to determine the lightning hazard distribution of the power network. The historical lightning hazard regions of the power network are divided into a region of back flashover failure points and a region of shielding failure points by terms of the nature of failure points. Both of the region of back flashover failure points and the region of shielding failure points are superposed respectively on the back flashover lightning hazard distribution map of the power network and the shielding failure lightning hazard distribution map of the power network. The historical failure regions in both of the maps are rendered with an attribute upward adjacent to the regions. When the shielding failure lightning hazard distribution map and the back flashover lightning hazard distribution map are integrated, the respective grids are rendered with the rendering attribute at one of the corresponding locations with a higher attribute level of the density value in both of the maps to form the lightning hazard distribution of the power network as illustrated in FIG. 4. The area rendered with small thin dots has the lowest risk of being subject to shielding failure and back flashover lightning hazards, and the lightning densities with amplitude in both shielding failure hazardous range and back flashover hazardous failure range are the lowest; the area rendered with circles has the second lowest risk of being subject to shielding failure and back flashover lightning hazard; the area rendered with oblique lines has the third lowest risk of being subject to shielding failure and back flashover lightning hazard; and the area rendered with facets has the highest risk of being subject to shielding failure and back flashover lightning hazard.

The invention claimed is:

1. A method for determining a lightning hazard distribution of a power network, wherein the method uses a processor for executing instructions stored on a non-transitory computer readable medium, and wherein when the instructions are executed, the method is performed as follows:
   dividing, by the processor, a target region of the power network into geographical grids;
   counting, by the processor, a number of ground lightnings in each geographical grid of the geographical grids, constructing a lightning faults database, and storing, by the processor, the number of ground lightnings in each geographical grid in the lightning faults database;
   setting, by the processor, ranges of hazardous currents comprising a shielding failure hazardous current range and a back flashover hazardous current range;
   deriving, by the processor, a shielding failure lightning hazard distribution of the power network and a back flashover lightning hazard distribution of the power network from the number of ground lightnings in each geographical grid of the power network and the ranges of hazardous currents, and deriving a historical lightning hazard distribution of the power network from the lightning faults database of the power network and the geographical grids;
   determining, by the processor, the lightning hazard distribution of the power network by integrating the shielding failure lightning hazard distribution of the power network, the back flashover lightning hazard distribution of the power network and the historical lightning hazard distribution of the power network;
   obtaining a lightning hazard distribution map of the power network based on the lightning hazard distribution of the power network determined by the processor; and
   determining appropriate lightning measure and protecting the power network from lightning hazard according to the lightning hazard distribution by reducing a lightning withstand level of transmission lines of the power network.

2. The method according to claim 1, wherein
the deriving the shielding failure lightning hazard distribution of the power network and the back flashover lightning hazard distribution of the power network from the number of ground lightnings of in each geographical grid of the power network and the ranges of hazardous currents comprises:
   setting a maximum and a minimum of the shielding failure hazardous current range and a maximum and a minimum of the back flashover hazardous current range according to an insulation margin of the power network;
   performing amplitude comparison between amplitudes of lightning current of each geographical grid of the geographical grids and the values of the shielding failure hazardous current range and the values of the back flashover hazardous current range, and removing data of part of the geographical grids with amplitudes of lightning current beyond the shielding failure hazardous current range and the back flashover hazardous current range which are set as above; and
   dividing a number of remaining ground lightnings by geographical grid areas of the remaining geographical grids corresponding to the remaining ground lightnings to get the shielding failure lightning hazard distribution of the who power network and the back flashover lightning hazard distribution of the power network respectively.

3. The method according to claim 1, wherein
deriving the historical lightning hazard distribution of the power network from the lightning faults database of the power network and the geographical grids comprises:
   creating a lightning failure database of the power network;
   comparing in position data from the lightning failure database of the power network and the geographical grids, and invoking shielding failure points and back flashover failure points into corresponding geographical grids by longitudinal and latitudinal coordinates of geographical information; and
   marking the geographical grids in connection with grids which serve as a center to get the historical lightning hazard distribution of the power network.

4. The method according to claim 1, wherein
the determining the lightning hazard distribution of the power network by integrating the shielding failure lightning hazard distribution of the power network, the back flashover lightning hazard distribution of the power network and the historical lightning hazard distribution of the power network comprises:
   dividing the historical lightning hazard distribution of the power network into a region of back flashover failure points and a region of shielding failure points by terms of nature of failure points;
   superposing the region of back flashover failure points and the region of shielding failure points respectively on the back flashover lightning hazard distribution of the power network and the shielding failure lightning hazard distribution of the power network; and
   rendering a historical failure region resulting from the superposing with an attribute upward adjacent to the region respectively,
   wherein respective geographical grids are rendered with a rendering attribute which has a higher attribute level of a density value in corresponding locations of the shielding failure lightning hazard distribution of the power network and the back flashover lightning hazard distribution of the power network when integrating the shielding failure lightning hazard distribution of the power network and the back flashover lightning hazard distribution of the power network, to form the lightning hazard distribution of the power network.

* * * * *